United States Patent
Liu et al.

(10) Patent No.: US 12,541,971 B2
(45) Date of Patent: Feb. 3, 2026

(54) METHOD FOR MONITORING SOIL EROSION RATE IN WIND- WATER COMPLEX EROSION REGION

(71) Applicant: China Institute of Water Resources and Hydropower Research, Beijing (CN)

(72) Inventors: Guangquan Liu, Beijing (CN); Xiaoning Tu, Beijing (CN); Ning Ai, Yan'an (CN); Xueyan Wang, Suzhou (CN); Puhang Li, Xi'an (CN); Pengfei Du, Beijing (CN); Chunyu Qi, Beijing (CN); Bin Zhang, Beijing (CN); Yingyin Qi, Beijing (CN); Jian Hou, Yan'an (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 29 days.

(21) Appl. No.: 19/215,867

(22) Filed: May 22, 2025

(65) Prior Publication Data
US 2026/0004577 A1 Jan. 1, 2026

(30) Foreign Application Priority Data
Jun. 27, 2024 (CN) .......................... 202410842160.4

(51) Int. Cl.
*G06V 20/17* (2022.01)
*G06T 7/62* (2017.01)
(Continued)

(52) U.S. Cl.
CPC ................ *G06V 20/17* (2022.01); *G06T 7/62* (2017.01); *G06V 10/26* (2022.01); *G06V 20/188* (2022.01);
(Continued)

(58) Field of Classification Search
CPC ...... G06V 10/26; G06V 20/17; G06V 20/188; G06T 7/62; G06T 2207/10032; G06T 2207/30188
See application file for complete search history.

(56) References Cited

FOREIGN PATENT DOCUMENTS

| CN | 102565301 A | 7/2012 |
|----|-------------|--------|
| CN | 104569355 B | 4/2015 |

(Continued)

OTHER PUBLICATIONS

Selkirk, Jennifer M., and L. J. Saffigna. "Wind and water erosion of a peat and sand area on subantarctic Macquarie Island." Arctic, Antarctic, and Alpine Research 31.4 (1999): 412-420. (Year: 1999).*

(Continued)

*Primary Examiner* — Tracy Mangialaschi
(74) *Attorney, Agent, or Firm* — Birchwood IP

(57) ABSTRACT

Disclosed is a method for monitoring soil erosion rate in a wind-water complex erosion region, which includes dividing a soil erosion monitoring area into a bare area and a vegetated area, performing grid division, and obtaining soil erodibility of each grid in the bare area and the vegetated area; obtaining a bare area reference grid and a vegetated area reference grid; obtaining image data of both the bare area and the vegetated area at monitoring starting and ending moments; calculating soil erosion volumes of both the bare area reference grid and the vegetated area reference grid; calculating a soil erosion volume corrected by soil erodibility; and calculating the soil erosion rate according to the soil erosion volume corrected by soil erodibility, and completing the monitoring of the soil erosion rate. The problem that the workload and monitoring accuracy of the existing monitoring methods cannot be balanced is solved.

3 Claims, 1 Drawing Sheet

(51) Int. Cl.
*G06V 10/26* (2022.01)
*G06V 20/10* (2022.01)

(52) U.S. Cl.
CPC .............. *G06T 2207/10032* (2013.01); *G06T 2207/30188* (2013.01)

(56) References Cited

FOREIGN PATENT DOCUMENTS

| CN | 105842426 B | 8/2016 |
| CN | 109164035 B | 1/2019 |
| CN | 113642191 B | 11/2021 |
| CN | 116773778 A | 9/2023 |
| CN | 117711510 A | 3/2024 |

OTHER PUBLICATIONS

Svendsen, Niels G., Prasanta K. Kalita, and Dick L. Gebhart. "Evaluation of soil loss and erosion control measures on ranges and range structures at installations in temperate climates." (2006). (Year: 2006).*

Fu Xuhui, Modeltest on composite hydraulic erosion of soil bank slope, «Port & Waterway Engineering» , No. 8 Serial No. 613, Aug. 31, 2023(Aug. 31, 2023), pp. 163-169.

* cited by examiner

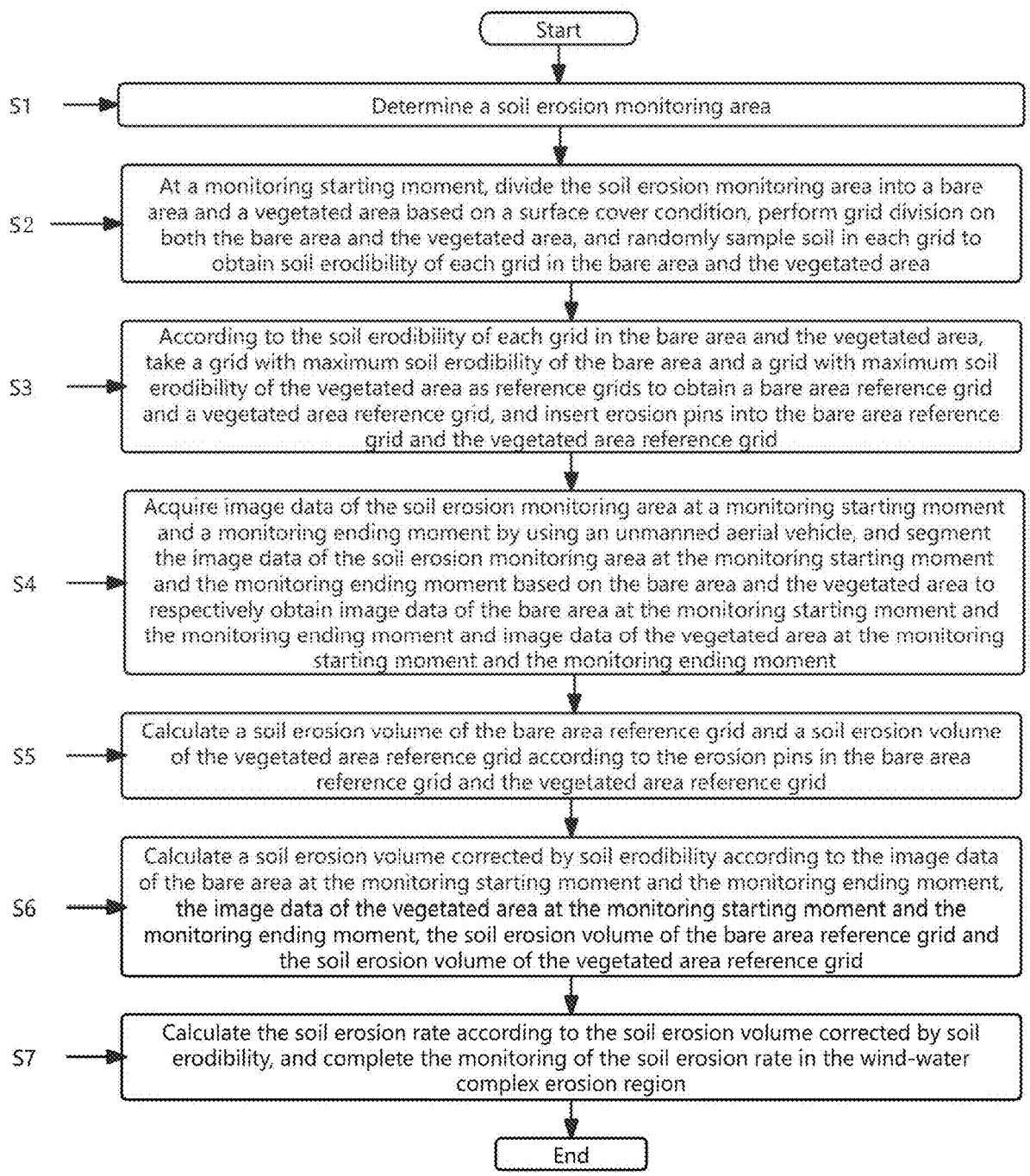

METHOD FOR MONITORING SOIL EROSION RATE IN WIND- WATER COMPLEX EROSION REGION

CROSS-REFERENCE TO RELATED APPLICATIONS

This application claims priority to Chinese Patent Application No. 202410842160.4, filed on Jun. 27, 2024, which is hereby incorporated by reference in its entirety.

TECHNICAL FIELD

The present invention belongs to the field of soil erosion rate monitoring, and in particular, to a method for monitoring soil erosion rate in a wind-water complex erosion region.

BACKGROUND

Wind-water complex erosion refers to the combined and alternating effects of wind and water on the same erosion object. Essentially, the wind-water complex erosion is the transportation and deposition of surface materials by one erosion force, which prepares the material basis for the further action of another erosion force and reshapes the existing erosion landform.

In arid and semi-arid regions, wind erosion and water erosion often occur simultaneously or alternately, forming unique wind-water complex erosion. Wind erosion and water erosion are intercausal, alternating in time and interlaced in space. Soil erosion leads to land degradation and reduced productivity, seriously affecting agricultural production and ecosystem stability.

Due to the complexity and severity of wind-water complex erosion, it is particularly important to conduct quantitative research and monitoring on the wind-water complex erosion. This helps to understand the dynamic changes of the erosion process, assess the impact of erosion on the environment and ecology, and provide a scientific basis for formulating effective prevention and control measures.

Existing monitoring methods include water measurement method, volumetric measurement method, hydrological measurement method, and erosion pin method. Specifically, the water measurement method directly observes changes in microtopography elevation by a set of fixed markers, thereby determining the rate at which a soil profile is eroded, which achieves direct observation of the erosion rate, with intuitive results. However, this method involves a large amount of work and is highly susceptible to human factors. The volumetric measurement method calculates the erosion volume by measuring the changes in a cross-sectional profiles of rills, shallow gullies, and cut gullies. This method is suitable for monitoring gully erosion and can accurately reflect the erosion volume of gully erosion. However, the operation is relatively complicated. The hydrological measurement method indirectly reflects soil erosion conditions by measuring the sediment accumulation in reservoirs and combining the sediment accumulation with the sediment transport ratio. This method is suitable for monitoring at the watershed scale. However, this method does not comprehensively consider all factors influencing soil erosion and ignores the effects of other factors. The erosion pin method calculates the soil erosion rate by setting fixed markers (such as erosion pins) on the ground and regularly measuring the changes in heights of the pins above the ground. This method is simple, easy to implement, and low-cost. However, this method may be affected by human destruction or natural factors.

SUMMARY

Aiming at the defects in the prior art, a method for monitoring soil erosion rate in a wind-water complex erosion region provided by the present invention solves the problem that the workload and monitoring accuracy of the existing monitoring methods cannot be balanced.

To achieve the above objective, the present invention uses the following technical solutions. A method for monitoring soil erosion rate in a wind-water complex erosion region includes the following steps:

S1: determining a soil erosion monitoring area;

S2: at a monitoring starting moment, dividing the soil erosion monitoring area into a bare area and a vegetated area based on a surface cover condition, performing grid division on both the bare area and the vegetated area, and randomly sampling soil in each grid to obtain soil erodibility of each grid in the bare area and the vegetated area;

S3: according to the soil erodibility of each grid in the bare area and the vegetated area, taking a grid with maximum soil erodibility of the bare area and a grid with maximum soil erodibility of the vegetated area as reference grids to obtain a bare area reference grid and a vegetated area reference grid, and inserting erosion pins into the bare area reference grid and the vegetated area reference grid;

S4: acquiring image data of the soil erosion monitoring area at a monitoring starting moment and a monitoring ending moment by using an unmanned aerial vehicle, and segmenting the image data of the soil erosion monitoring area at the monitoring starting moment and the monitoring ending moment based on the bare area and the vegetated area to respectively obtain image data of the bare area at the monitoring starting moment and the monitoring ending moment and image data of the vegetated area at the monitoring starting moment and the monitoring ending moment;

S5: calculating a soil erosion volume of the bare area reference grid and a soil erosion volume of the vegetated area reference grid according to the erosion pins in the bare area reference grid and the vegetated area reference grid;

S6: calculating a soil erosion volume corrected by soil erodibility according to the image data of the bare area at the monitoring starting moment and the monitoring ending moment, the image data of the vegetated area at the monitoring starting moment and the monitoring ending moment, the soil erosion volume of the bare area reference grid and the soil erosion volume of the vegetated area reference grid; and S7: calculating the soil erosion rate according to the soil erosion volume corrected by soil erodibility, and completing the monitoring of the soil erosion rate in the wind-water complex erosion region.

Further, the S2 specifically is as follows:

S201: at the monitoring starting moment, dividing the soil erosion monitoring area into a bare area and a vegetated area based on a surface cover condition;

S202: setting grid division widths of the bare area and the vegetated area, and performing grid division based on the set grid division widths of the bare area and the vegetated area to obtain a grid division result of the bare area and a grid division result of the vegetated area; and S203: randomly sampling soil in each grid according to the grid division result of the bare area and the grid division result of the vegetated area, and calculating the soil erodibility of each grid in the bare area and the vegetated area.

Further, an expression for calculating the soil erodibility of each grid in the bare area and the vegetated area in the S203 is as follows:

$$Soil_s = [S_i^s]$$

$$Soil_c = [S_j^c]$$

$$S_r^{ty} = \begin{cases} \dfrac{\sum\left[\gamma_1 \dfrac{(N_{soil} - N_{scat})}{N_{soil}} + \gamma_2 \dfrac{(N_{soil} - F(f, soil))}{N_{soil}}\right]}{N}; & ty = s; r = i; \gamma_1 < \gamma_2 \\ \dfrac{\sum\left[\gamma_1 \dfrac{(N_{soil} - N_{scat})}{N_{soil}} + \gamma_2 \dfrac{(N_{soil} - F(f, soil))}{N_{soil}}\right]}{N}; & ty = c; r = j; \gamma_1 > \gamma_2 \end{cases}$$

$$F(f, soil) = \sum \left(f_1 l_{soil, f_1} + f_2 l_{soil, f_2} +, \ldots, + f_{max} l_{soil, f_{max}}\right)$$

wherein $Soil_s$ is soil erodibility of each grid in the bare area; $S_i^s$ is soil erodibility of an $i^{th}$ grid in the bare area; $Soil_c$ is soil erodibility of each grid in the vegetated area; $S_j^c$ is soil erodibility of a $j^{th}$ grid in the vegetated area; $S_r^{ty}$ is soil erodibility of a grid; $\gamma_1$ is a water erosion weight coefficient; $N_{soil}$ is a total number of soil particles sampled; $N_{scat}$ is a number of collapsed soil particles after water action; $\gamma_2$ is a wind erosion weight coefficient; F (f, soil) is a number of soil particles separated under the action of wind f; N is a number of samplings; ty is an area identifier to which the grid belongs; s is a bare area identifier; c is a vegetated area identifier; r is a grid number identifier; i is a bare area grid number; j is a vegetated area grid number; $f_1$ is occurrence probability of a first wind intensity in the soil erosion monitoring area; $l_{soil, f_1}$ is a number of soil particles separated under the first wind intensity; $f_2$ is occurrence probability of a second wind intensity in the soil erosion monitoring area; $l_{soil, f_2}$ is a number of soil particles separated under the second wind intensity; $f_{max}$ is occurrence probability of a max wind intensity in the soil erosion monitoring area; $l_{soil, f_{max}}$ is a number of soil particles separated under the max wind intensity; and max is a maximum level of wind intensity during the data acquisition period in the soil erosion monitoring area.

Further, the S6 specifically is as follows:

S601: performing gray processing on the image data of the bare area at the monitoring starting moment and the monitoring ending moment and the image data of the vegetated area at the monitoring starting moment and the monitoring ending moment to obtain gray images of the bare area at the monitoring starting moment and the monitoring ending moment and gray images of the vegetated area at the monitoring starting moment and the monitoring ending moment;

S602: according to a gray image of the bare area at the monitoring starting moment and a gray image of the bare area at the monitoring ending moment, subtracting an average gray value at a grid ending moment from an average gray value at a grid starting moment to obtain a gray difference of each grid in the bare area;

S603: according to a gray image of the vegetated area at the monitoring starting moment and a gray image of the vegetated area at the monitoring ending moment, subtracting an average gray value at a grid ending moment from an average gray value at a grid starting moment to obtain a gray difference of each grid in the vegetated area;

S604: respectively obtaining a gray difference of a reference grid in the bare area and a gray difference of a reference grid in the vegetated area according to the gray difference of each grid in the bare area and the gray difference of each grid in the vegetated area, and calculating a soil erosion volume of a single gray value change according to the soil erosion volume of the reference grid in the bare area, the soil erosion volume of the reference grid in the vegetated area, the gray difference of the reference grid in the bare area and the gray difference of the reference grid in the vegetated area; and S605: calculating the soil erosion volume corrected by soil erodibility according to the soil erosion volume of the single gray value change, the gray difference of each grid in the bare area and the gray difference of each grid in the vegetated area.

Further, an expression for calculating a soil erosion volume of a single gray value change in the S604 is as follows:

$$E_s = \frac{A_{s,O}}{H_{s,O}}$$

$$E_c = \frac{A_{c,O}}{H_{c,O}}$$

wherein $E_s$ is a soil erosion volume of a single gray value change in the bare area; $A_{s,O}$ is the soil erosion volume of the reference grid in the bare area; $H_{s,O}$ is the gray difference of the reference grid in the bare area; $E_c$ is a soil erosion volume of a single gray value change in the vegetated area; $A_{c,O}$ is the soil erosion volume of the reference grid in the vegetated area; and $H_{c,O}$ is the gray difference of the reference grid in the vegetated area.

Further, an expression for calculating the soil erosion volume corrected by soil erodibility in the S605 is as follows:

$$A = \sum \frac{H_{s,i} E_s S_i^s}{S_O^s} + \sum \frac{H_{c,j} E_c S_j^c}{S_O^c}$$

wherein A is the soil erosion volume corrected by soil erodibility; $H_{s,i}$ is a gray difference of an $i^{th}$ grid in the bare area; $E_s$ is the soil erosion volume of the single gray value change in the bare area; $S_i^s$ is soil erodibility of an $i^{th}$ grid in the bare area; $S_O^s$ is soil erodibility of the reference grid in the bare area; $H_{c,j}$ is a gray difference of a $j^{th}$ grid in the vegetated area; $E_c$ is the soil erosion volume of the single gray value change in the vegetated area; $S_j^c$ is soil erodibility of a $j^{th}$ grid in the vegetated area; and $S_O^c$ is soil erodibility of the reference grid in the vegetated area.

The present invention has the beneficial effects as follows: the present invention combines traditional monitoring methods with modern monitoring methods, establishes standards through soil erodibility, takes reference grids as benchmarks, calculates soil erosion volume using traditional monitoring methods on the reference grids, and calculates overall soil erosion volume based on the soil erosion volume of the reference grids, thereby improving the accuracy of the method while ensuring the calculation speed; similarly, based on the soil erodibility of the grid, corrections are made based on the reference grids, thereby improving the accuracy of the method.

BRIEF DESCRIPTION OF DRAWINGS

FIG. 1 is a flow chart of a method according to the present invention.

DESCRIPTION OF EMBODIMENTS

The following description of the specific embodiments of the present invention is provided to facilitate the understanding of the present invention by those skilled in the art, however, it should be understood that the present invention is not limited to the scope of the specific embodiments, and for those of ordinary skill in the art, various changes that are made without departing from the spirit and scope of the present invention as defined and determined by the appended claims are apparent, and all inventions and creations that are made by using the concept of the present invention are within the protective scope.

As shown in FIG. 1, in one embodiment of the present invention, a method for monitoring soil erosion rate in a wind-water complex erosion region includes the following steps:

S1: determining a soil erosion monitoring area;

S2: at a monitoring starting moment, dividing the soil erosion monitoring area into a bare area and a vegetated area based on a surface cover condition, performing grid division on both the bare area and the vegetated area, and randomly sampling soil in each grid to obtain soil erodibility of each grid in the bare area and the vegetated area;

S3: according to the soil erodibility of each grid in the bare area and the vegetated area, taking a grid with maximum soil erodibility of the bare area and a grid with maximum soil erodibility of the vegetated area as reference grids to obtain a bare area reference grid and a vegetated area reference grid, and inserting erosion pins into the bare area reference grid and the vegetated area reference grid;

S4: acquiring image data of the soil erosion monitoring area at a monitoring starting moment and a monitoring ending moment by using an unmanned aerial vehicle, and segmenting the image data of the soil erosion monitoring area at the monitoring starting moment and the monitoring ending moment based on the bare area and the vegetated area to respectively obtain image data of the bare area at the monitoring starting moment and the monitoring ending moment and image data of the vegetated area at the monitoring starting moment and the monitoring ending moment;

S5: calculating a soil erosion volume of the bare area reference grid and a soil erosion volume of the vegetated area reference grid according to the erosion pins in the bare area reference grid and the vegetated area reference grid;

S6: calculating a soil erosion volume corrected by soil erodibility according to the image data of the bare area at the monitoring starting moment and the monitoring ending moment, the image data of the vegetated area at the monitoring starting moment and the monitoring ending moment, the soil erosion volume of the bare area reference grid and the soil erosion volume of the vegetated area reference grid; and S7: calculating the soil erosion rate according to the soil erosion volume corrected by soil erodibility, and completing the monitoring of the soil erosion rate in the wind-water complex erosion region.

In this embodiment, the criterion for dividing the bare area and the vegetated area is whether the ground is bare. The S2 specifically is as follows:

S201: at the monitoring starting moment, dividing the soil erosion monitoring area into a bare area and a vegetated area based on a surface cover condition;

S202: setting grid division widths of the bare area and the vegetated area, and performing grid division based on the set grid division widths of the bare area and the vegetated area to obtain a grid division result of the bare area and a grid division result of the vegetated area; and S203: randomly sampling soil in each grid according to the grid division result of the bare area and the grid division result of the vegetated area, and calculating the soil erodibility of each grid in the bare area and the vegetated area.

An expression for calculating the soil erodibility of each grid in the bare area and the vegetated area in the S203 is as follows:

$$\text{Soil}_s = [S_i^s]$$

$$\text{Soil}_c = [S_j^c]$$

$$S_r^{ty} = \begin{cases} \dfrac{\sum\left[\gamma_1 \dfrac{(N_{soil} - N_{scat})}{N_{soil}} + \gamma_2 \dfrac{(N_{soil} - F(f, \text{soil}))}{N_{soil}}\right]}{N}; & ty = s; r = i; \gamma_1 < \gamma_2 \\ \dfrac{\sum\left[\gamma_1 \dfrac{(N_{soil} - N_{scat})}{N_{soil}} + \gamma_2 \dfrac{(N_{soil} - F(f, \text{soil}))}{N_{soil}}\right]}{N}; & ty = c; r = j; \gamma_1 > \gamma_2 \end{cases}$$

$$F(f, \text{soil}) = \sum \left(f_1 l_{soil, f_1} + f_2 l_{soil, f_2} +, \ldots, + f_{max} l_{soil, f_{max}}\right)$$

wherein $\text{Soil}_s$ is soil erodibility of each grid in the bare area; $S_i^s$ is soil erodibility of an $i^{th}$ grid in the bare area; $\text{Soil}_c$ is soil erodibility of each grid in the vegetated area; $S_j^c$ is soil erodibility of a $j^{th}$ grid in the vegetated area; $S_r^{ty}$ is soil erodibility of a grid; $\gamma_1$ is a water erosion weight coefficient; $N_{soil}$ is a total number of soil particles sampled; $N_{scat}$ is a number of collapsed soil particles after water action; $\gamma_2$ is a wind erosion weight coefficient; F (f, soil) is a number of soil particles separated under the action of wind f; N is a number of samplings; ty is an area identifier to which the grid belongs; s is a bare area identifier; c is a vegetated area identifier; r is a grid number identifier; i is a bare area grid number; j is a vegetated area grid number; $f_1$ is occurrence probability of a first wind intensity in the soil erosion monitoring area; $l_{soil, f_1}$ is a number of soil particles separated under the first wind intensity; $f_2$ is occurrence probability of a second wind intensity in the soil erosion monitoring area; $l_{soil, f_2}$ is a number of soil particles separated under the second wind intensity; $f_{max}$ is occurrence probability of a max wind intensity in the soil erosion monitoring area; $l_{soil, f_{max}}$ is a number of soil particles separated under the max wind intensity; and max is a maximum level of wind intensity during the data acquisition period in the soil erosion monitoring area.

In this embodiment, when grid division is performed, some areas have widths and lengths that are less than a grid division width and may be treated as a single grid; if a width is less than a grid division width and a length is greater than a grid division width, the length is used as a division direction.

In this embodiment, wind intensity is obtained based on historical wind monitoring data in the soil erosion monitoring area: a level interval of wind intensity is set, the wind intensity is divided based on the level interval, and the occurrence probability of each wind intensity is counted; and a first wind intensity to a max wind intensity are ranked based on the wind magnitude.

The S6 specifically is as follows:

S601: performing gray processing on the image data of the bare area at the monitoring starting moment and the monitoring ending moment and the image data of the vegetated area at the monitoring starting moment and the monitoring ending moment to obtain gray images of the bare area at the monitoring starting moment and the monitoring ending moment and gray images of the vegetated area at the monitoring starting moment and the monitoring ending moment;

S602: according to a gray image of the bare area at the monitoring starting moment and a gray image of the bare area at the monitoring ending moment, subtracting an average gray value at a grid ending moment from an average gray value at a grid starting moment to obtain a gray difference of each grid in the bare area;

S603: according to a gray image of the vegetated area at the monitoring starting moment and a gray image of the vegetated area at the monitoring ending moment, subtracting an average gray value at a grid ending moment from an average gray value at a grid starting moment to obtain a gray difference of each grid in the vegetated area;

S604: respectively obtaining a gray difference of a reference grid in the bare area and a gray difference of a reference grid in the vegetated area according to the gray difference of each grid in the bare area and the gray difference of each grid in the vegetated area, and calculating a soil erosion volume of a single gray value change according to the soil erosion volume of the reference grid in the bare area, the soil erosion volume of the reference grid in the vegetated area, the gray difference of the reference grid in the bare area and the gray difference of the reference grid in the vegetated area; and S605: calculating the soil erosion volume corrected by soil erodibility according to the soil erosion volume of the single gray value change, the gray difference of each grid in the bare area and the gray difference of each grid in the vegetated area.

An expression for calculating a soil erosion volume of a single gray value change in the S604 is as follows:

$$E_s = \frac{A_{s,O}}{H_{s,O}}$$

$$E_c = \frac{A_{c,O}}{H_{c,O}}$$

wherein $E_s$ is a soil erosion volume of a single gray value change in the bare area; $A_{s,O}$ is the soil erosion volume of the reference grid in the bare area; $H_{s,O}$ is the gray difference of the reference grid in the bare area; $E_c$ is a soil erosion volume of a single gray value change in the vegetated area; $A_{c,O}$ is the soil erosion volume of the reference grid in the vegetated area; and $H_{c,O}$ is the gray difference of the reference grid in the vegetated area.

An expression for calculating the soil erosion volume corrected by soil erodibility in the S605 is as follows:

$$A = \sum \frac{H_{s,i} E_s S_i^s}{S_O^s} + \sum \frac{H_{c,j} E_c S_j^c}{S_O^c}$$

wherein A is the soil erosion volume corrected by soil erodibility; $H_{s,i}$ is a gray difference of an $i^{th}$ grid in the bare area; $E_s$ is the soil erosion volume of the single gray value change in the bare area; $S_i^s$ is soil erodibility of an $i^{th}$ grid in the bare area; $S_O^s$ is soil erodibility of the reference grid in the bare area; $H_{c,j}$ is a gray difference of a $j^{th}$ grid in the vegetated area; $E_c$ is the soil erosion volume of the single gray value change in the vegetated area; $S_j^c$ is soil erodibility of a $j^{th}$ grid in the vegetated area; and $S_O^c$ is soil erodibility of the reference grid in the vegetated area.

In this embodiment, since the soil erosion volumes in the gray unit change under different soil erodibilities are different, the "soil erosion volume of a single gray value change" calculated based on the reference grid cannot be directly calculated, and the error is too large. The soil erodibility of each grid is added for correction, so that the calculation accuracy can be improved

What is claimed is:

1. A method for monitoring soil erosion rate in a wind-water complex erosion region, comprising the following steps:

S1: determining a soil erosion monitoring area;

S2: at a monitoring starting moment, dividing the soil erosion monitoring area into a bare area and a vegetated area based on a surface cover condition, performing grid division on both the bare area and the vegetated area, and randomly sampling soil in each grid to obtain soil erodibility of each grid in the bare area and the vegetated area;

S3: according to the soil erodibility of each grid in the bare area and the vegetated area, taking a grid with maximum soil erodibility of the bare area and a grid with maximum soil erodibility of the vegetated area as reference grids to obtain a bare area reference grid and a vegetated area reference grid, and inserting erosion pins into the bare area reference grid and the vegetated area reference grid;

S4: acquiring image data of the soil erosion monitoring area at the monitoring starting moment and a monitoring ending moment by using an unmanned aerial vehicle, and segmenting the image data of the soil erosion monitoring area at the monitoring starting moment and the monitoring ending moment based on the bare area and the vegetated area to respectively obtain image data of the bare area at the monitoring starting moment and the monitoring ending moment and image data of the vegetated area at the monitoring starting moment and the monitoring ending moment;

S5: calculating a soil erosion volume of the bare area reference grid and a soil erosion volume of the vegetated area reference grid according to the erosion pins in the bare area reference grid and the vegetated area reference grid;

S6: calculating a soil erosion volume corrected by soil erodibility according to the image data of the bare area at the monitoring starting moment and the monitoring ending moment, the image data of the vegetated area at the monitoring starting moment and the monitoring ending moment, the soil erosion volume of the bare area reference grid and the soil erosion volume of the vegetated area reference grid; wherein the S6 specifically is as follows:

S601: performing gray processing on the image data of the bare area at the monitoring starting moment and the monitoring ending moment and the image data of the vegetated area at the monitoring starting moment and the monitoring ending moment to obtain gray images of the bare area at the monitoring starting moment and the monitoring ending moment and gray images of the vegetated area at the monitoring starting moment and the monitoring ending moment;

S602: according to a gray image of the bare area at the monitoring starting moment and a gray image of the bare area at the monitoring ending moment, subtracting an average gray value at a grid ending moment from an average gray value at a grid starting moment to obtain a gray difference of each grid in the bare area;

S603: according to a gray image of the vegetated area at the monitoring starting moment and a gray image of the vegetated area at the monitoring ending moment, subtracting an average gray value at a grid ending moment from an average gray value at a grid starting moment to obtain a gray difference of each grid in the vegetated area;

S604: respectively obtaining a gray difference of a reference grid in the bare area and a gray difference of a reference grid in the vegetated area according to the gray difference of each grid in the bare area and the gray difference of each grid in the vegetated area, and calculating a soil erosion volume of a single gray value change according to the soil erosion volume of the reference grid in the bare area, the soil erosion volume of the reference grid in the vegetated area, the gray difference of the reference grid in the bare area and the gray difference of the reference grid in the vegetated area; wherein an expression for calculating the soil erosion volume of the single gray value change in the S604 is as follows:

$$E_s = \frac{A_{s,O}}{H_{s,O}}$$

$$E_c = \frac{A_{c,O}}{H_{c,O}}$$

wherein $E_s$ is a soil erosion volume of a single gray value change in the bare area; $A_{s,O}$ is the soil erosion volume of the reference grid in the bare area; $H_{s,O}$ is the gray difference of the reference grid in the bare area; $E_c$ is a soil erosion volume of a single gray value change in the vegetated area; $A_{c,O}$ is the soil erosion volume of the reference grid in the vegetated area; and $H_{c,O}$ is the gray difference of the reference grid in the vegetated area;

S605: calculating the soil erosion volume corrected by soil erodibility according to the soil erosion volume of the single gray value change, the gray difference of each grid in the bare area and the gray difference of each grid in the vegetated area; wherein an expression for calculating the soil erosion volume corrected by soil erodibility in the S605 is as follows:

$$A = \sum \frac{H_{s,i} E_s S_i^s}{S_O^s} + \sum \frac{H_{c,j} E_c S_j^c}{S_O^c}$$

wherein A is the soil erosion volume corrected by soil erodibility; $H_{s,i}$ is a gray difference of an $i^{th}$ grid in the bare area; $E_s$ is the soil erosion volume of the single gray value change in the bare area; $S_i^s$ is soil erodibility of an $i^{th}$ grid in the bare area; $S_O^s$ is soil erodibility of the reference grid in the bare area; $H_{c,j}$ is a gray difference of a $j^{th}$ grid in the vegetated area; $E_c$ is the soil erosion volume of the single gray value change in the vegetated area; $S_j^c$ is soil erodibility of a $j^{th}$ grid in the vegetated area; and $S_O^c$ is soil erodibility of the reference grid in the vegetated area; and S7: calculating the soil erosion rate according to the soil erosion volume corrected by soil erodibility, and completing the monitoring of the soil erosion rate in the wind-water complex erosion region.

2. The method for monitoring the soil erosion rate in the wind-water complex erosion region according to claim 1, wherein the S2 specifically is as follows:

S201: at the monitoring starting moment, dividing the soil erosion monitoring area into the bare area and the vegetated area based on the surface cover condition;

S202: setting grid division widths of the bare area and the vegetated area, and performing grid division based on the set grid division widths of the bare area and the vegetated area to obtain a grid division result of the bare area and a grid division result of the vegetated area; and S203: randomly sampling soil in each grid according to the grid division result of the bare area and the grid division result of the vegetated area, and calculating the soil erodibility of each grid in the bare area and the vegetated area.

3. The method for monitoring the soil erosion rate in the wind-water complex erosion region according to claim 2, wherein an expression for calculating the soil erodibility of each grid in the bare area and the vegetated area in the S203 is as follows:

$$\text{Soil}_s = [S_i^s]$$

$$\text{Soil}_c = [S_j^c]$$

$$S_r^{ty} = \begin{cases} \dfrac{\sum\left[\gamma_1 \dfrac{(N_{soil} - N_{scat})}{N_{soil}} + \gamma_2 \dfrac{(N_{soil} - F(f, \text{soil}))}{N_{soil}}\right]}{N}; \ ty = s; r = i; \gamma_1 < \gamma_2 \\ \dfrac{\sum\left[\gamma_1 \dfrac{(N_{soil} - N_{scat})}{N_{soil}} + \gamma_2 \dfrac{(N_{soil} - F(f, \text{soil}))}{N_{soil}}\right]}{N}; \ ty = c; r = j; \gamma_1 > \gamma_2 \end{cases}$$

$$F(f, \text{soil}) = \sum \left( f_1 l_{soil, f_1} + f_2 l_{soil, f_2} + \ldots + f_{max} l_{soil, f_{max}} \right)$$

wherein $\text{Soil}_s$ is soil erodibility of each grid in the bare area; $S_i^s$ is soil erodibility of an $i^{th}$ grid in the bare area; $\text{Soil}_c$ is soil erodibility of each grid in the vegetated area; $S_j^c$ is soil erodibility of a $j^{th}$ grid in the vegetated area; $S_r^{ty}$ is soil erodibility of a grid; $\gamma_1$ is a water erosion weight coefficient; $N_{soil}$ is a total number of soil particles sampled; $N_{scat}$ is a number of collapsed soil particles after water action; $\gamma_2$ is a wind erosion weight coefficient; F(f,soil) is a number of soil particles separated under an action of wind f; N is a number of samplings; ty is an area identifier to which the grid belongs; S is a bare area identifier; c is a vegetated area identifier; r is a grid number identifier; i is a bare area grid number; j is a vegetated area grid number; $f_1$ is occurrence probability of a first wind intensity in the soil erosion monitoring area; $l_{soil, f_1}$ is a number of soil particles separated under the first wind intensity; $f_2$ is occurrence probability of a second wind intensity in the soil erosion monitoring area; $l_{soil, f_2}$ is a number of soil particles separated under the second wind intensity; $f_{max}$ is occurrence probability of a max wind intensity in the soil erosion monitoring area; $l_{soil, f_{max}}$ is a number of soil particles separated under the max wind intensity; and max is a maximum level of wind intensity during the data acquisition period in the soil erosion monitoring area.

\* \* \* \* \*